Figure 1:
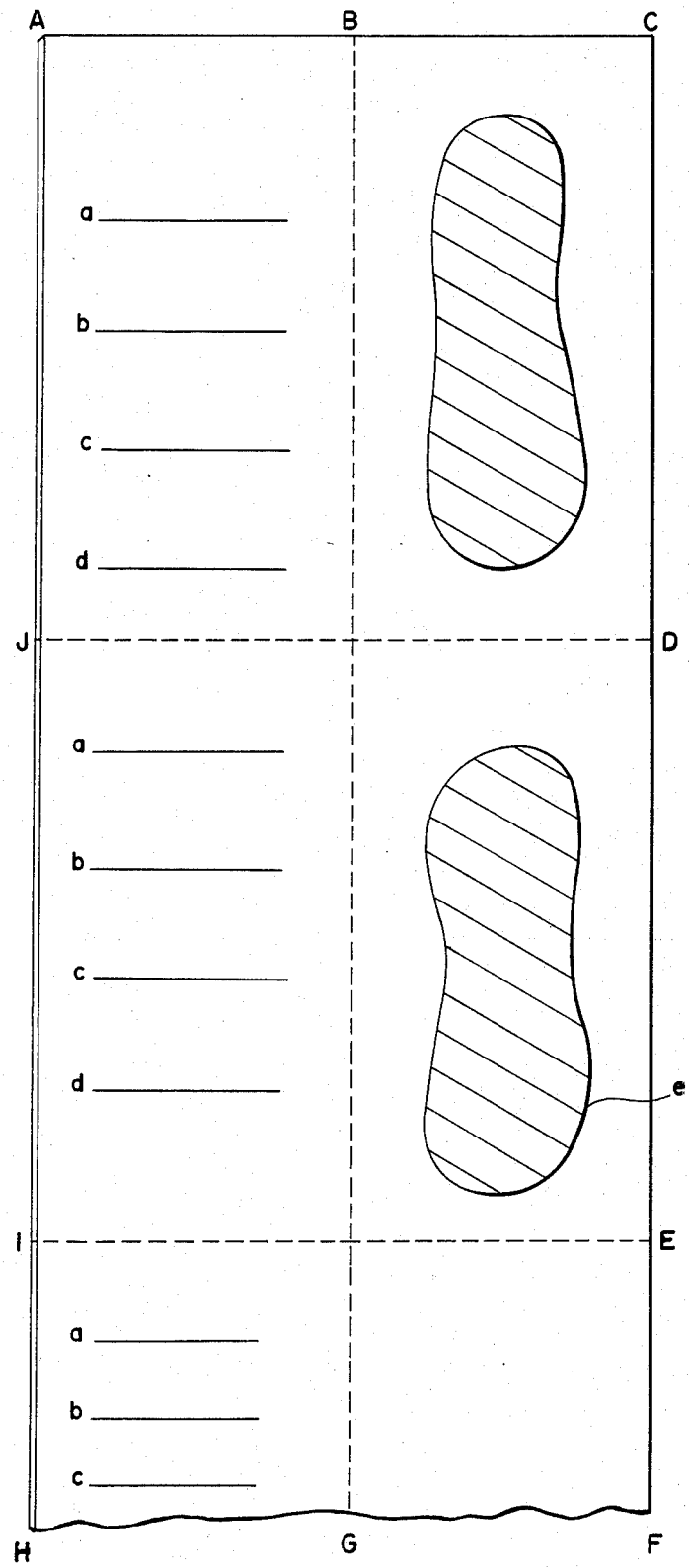

United States Patent [19]

Levine et al.

[11] Patent Number: 4,517,203

[45] Date of Patent: May 14, 1985

[54] PROCESS FOR MAKING A FRIED FRUIT FILLING COMPOSITION-CONTAINING FOOD PRODUCT

[75] Inventors: Lawrence W. Levine, Teaneck, N.H.; Carolyn C. Mullins, Seattle, Wash.

[73] Assignee: Carlin Foods Corporation, Chicago, Ill.

[21] Appl. No.: 492,911

[22] Filed: May 6, 1983

Related U.S. Application Data

[63] Continuation-in-part of Ser. No. 268,624, May 29, 1981, abandoned.

[51] Int. Cl.³ .................................................. A21D 13/08
[52] U.S. Cl. .................................................. 426/19; 426/94; 426/275; 426/502; 426/503; 426/514; 426/555; 426/560; 426/439
[58] Field of Search .................. 426/391, 94, 283, 391, 426/275, 439, 502, 503, 514, 19, 144, 555, 560

[56] References Cited

U.S. PATENT DOCUMENTS

| | | | |
|---|---|---|---|
| 3,049,426 | 8/1962 | Dorsey et al. | 426/283 X |
| 3,104,976 | 9/1963 | Tolley | 426/283 |
| 3,143,424 | 8/1964 | Wilson | 426/94 |
| 3,656,967 | 4/1972 | Barton | 426/94 |
| 3,767,823 | 10/1973 | Wheeler | 426/275 X |
| 3,782,966 | 1/1974 | Forkner | 426/94 |
| 4,170,659 | 10/1979 | Totino | 426/138 |
| 4,275,082 | 6/1981 | Dougan | 426/138 |

Primary Examiner—Jeanette Hunter
Attorney, Agent, or Firm—Grace J. Fishel

[57] ABSTRACT

There is disclosed a process for making a fruit filling composition-containing yeast-raised dough product such as a Danish pastry-type snack product which can be cooked by frying. The process comprises making a dough-shortening laminate, perforating a portion of the laminate, applying fruit filling composition to the laminate, folding the laminate over the filling, proofing the dough under yeast-activating conditions, and frying the raised product. Icing may be subsequently applied to the resulting product before it reaches room temperature.

13 Claims, 1 Drawing Figures

PROCESS FOR MAKING A FRIED FRUIT FILLING COMPOSITION-CONTAINING FOOD PRODUCT

This is a continuation-in-part of Ser. No. 268,624, filed May 29, 1981 now abandoned.

This invention relates to a process for making a fruit filling composition-containing dough product. The invention particularly concerns a process for making a fruit filling composition-containing dough product which is cooked by deep-fat frying.

Although the process of the invention may be used to make a wide variety of dough products which contain a fruit filling composition, it will be primarily discussed hereinafter with reference to Danish-type pastry products, and it should be understood that the scope of the invention is not limited to Danish-type pastry products.

It is known in the art to make a pastry product having a crust made from thin layers of dough on which are superposed thin layers of solid shortening covered with another thin layer of dough and so on to form a multi-layered dough-shortening laminate. The laminate may then be folded to multiply further the layers present in the laminate. A fruit filling may also be applied at some point on the surface of the folded dough-shortening laminate. Such a laminate results in a crust of unusual flakiness when baked. Products made of such a laminate which are baked and then covered with icing are known as Danish pastry.

Attempts have been made in the past to produce a food product of similar taste and texture to baked Danish pastry more efficiently. One such method involved frying a dough-shortening laminate product containing a fruit filling on the interior. Frying has been found to be more economical due to, among other things, the rapidity with which products are cooked thereby, and the resulting saving in labor time and increased output. Furthermore, fried products which absorb sufficient amounts of oil are found to possess a pleasing tenderness and freshness. However, such products have in the past been unsuccessful owing, among other things, to the inability of their fruit fillings to withstand the severe conditions encountered while frying in deep fat maintained at cooking temperatures. At such temperatures, prior art fillings were degraded and tended to destroy the integrity of the product. Specifically, excessive water content in the filling resulted in the formation of steam which would create undesirable crust expansion and rupturing causing "blow-out" of the food product exterior. Another problem resulted from "boil-out" of the fruit filling composition from outside the crust into the frying medium. "Blow-out" and "boil-out" also caused leakage of the frying medium into the interior of the snack product. The resulting contact of the frying medium with the interior filling composition promoted a breakdown of the composition's starch content and caramelization of its sugar content during frying. A similar problem was caused by expansion of air trapped inside the product which would also perforate and fracture the crust during frying, with similar results. The result of such prior attempts was an excessively oily product of inferior taste and contamination of the frying medium.

Consequently, it has become apparent that there is a need for a process of making a fruit composition-filled food product which can be fried rather than baked and which will not be subject to "blow-out" or "boil-out" during cooking. A need also exists for a process of making a snack product which contains a filling composition that is impervious to the rigors of deep frying, that is, maintains its integrity, remaining congealed in a single mass without deleterious changes in flavor during cooking.

Accordingly, it is an object of the present invention to provide a process for making a fruit filling composition-containing, yeast-raised dough product, capable of being fried, which by its configuration is not susceptible to air or steam "blow-out" during cooking and hence retains a crust which is free of perforated imperfections.

A further object of the invention is to provide a process for making a fruit filling-containing, yeast-raised, dough product having a fruit filling which retains its integrity under frying conditions, and which will not "boil-out", even while in direct contact with the frying medium.

A further object of the invention is to provide a process for making a fruit filling-containing, yeast-raised dough product capable of being fried, to which icing may be applied before cooling to ambient temperature.

A further object of the present invention is to provide a process for making a fruit filling composition-containing, yeast-raised, dough product, approximating the taste and texture of Danish pastry.

Briefly, the invention in its broader aspects comprehends a process for making a food product which comprises: forming a precursor product comprising an envelope of a dough-containing material which is capable of being cooked by frying, a fruit filling composition enveloped within said envelope, said composition being impervious to contact with a frying medium under cooking conditions, wherein said envelope has one or more perforations such as slits, furrows or notches exposing said composition, and immersing at least a portion of the precursor product in a frying medium under cooking conditions for a time sufficient to allow the frying medium to cook the envelope of dough-containing material.

Further aspects of the invention comprise a process for interleaving lengths of pastry-type dough layers with layers of solid shortening-containing compositions, folding the resulting dough-shortening laminate to increase the number of layers present, forming perforations such as slits, cuts, furrows or notches along one side of the dough-shortening laminate length, depositing a portion of fruit filling composition which is impervious to hot frying medium on the unperforated side at predetermined intervals, folding the perforated side of the dough-shortening laminate over the filling composition and the unperforated side of the laminate, cutting and sealing the edges of the dough, and proofing the cut and sealed product under yeast-activating conditions. The resulting proofed product is then suitable for frying. Icing may be applied to the fried product if desired. The resulting product approximates the taste and texture of conventionally-produced Danish pastry.

The dough composition used in the process of the invention can be any conventionally-known dough composition suitable for frying. Such a composition can be made by combining patent flour, that is, a high-grade wheat flour of about 11.0% to about 12.5% protein content, preferably about 11% to about 12%, protein content, with yeast and water and, optionally, additional modifying ingredients, in a mixer. The dough can be mixed for a relatively short period of time, about five minutes, in order to prevent overdevelopment which can result in an undesirable snappy, unworkable dough. The dough is preferably always maintained at a temperature ranging from about 58° to about 65° F., up until the proofing step. Such dough temperatures are maintained in order to prevent premature fermentation and yeast activity.

Additional modifying ingredients which can be added to the flour, water and yeast mixture prior to mixing are added in order to impart desirable qualities to the resulting dough mixture. Such ingredients include dextrose, which provides sweetness and desired crust color, as well as a nutrient source for yeast during fermentation, shortening for lubrication and tenderness, milk solids for crust color and richness, monoglycerides, diglycerides and lecithin as emulsifiers, salt for flavor and control of fermentation, soy flour for tenderizing the wheat flour, yellow corn flour for color, sodium phosphate, and sodium bicarbonate for leavening and tenderizing, sodium propionate as a preservative, and egg yolk for added richness and flavor. A list of ingredients and ranges for a dough composition containing such additional ingredients which may be used in the process of the invention is listed in Table I.

TABLE I

| Ingredients | % by Weight |
| --- | --- |
| Flour | 50–55 |
| Water | 30–35 |
| Yeast | 2.0–2.5 |
| Dextrose | 2.3–3.3 |
| Vegetable Oil | 2.0–3.0 |
| Skim Milk | 0.5–1.0 |
| Whey | 0.7–1.4 |
| Mono- and di-glycerides | 0.6–1.2 |
| Sugar | 0.4–1.0 |
| Soy Flour | 0.4–1.0 |
| Salt | 0.3–0.6 |
| Yellow Corn Flour | <0.3 |
| Sodium Phosphate | <0.3 |
| Lecithin | <0.2 |
| Sodium Bicarbonate | <0.2 |
| Egg Yolk | <0.2 |
| Paprika | <0.2 |
| Turmeric | <0.2 |
| Sodium Propionate | <0.2 |
| Natural and Artificial Flavor | <0.2 |

The fruit filling composition used in the process of the invention itself is especially formulated for this process in order to be impervious to frying medium at cooking temperatures. The composition has a high solids content which hinders the evolution of steam and resulting "blow-out" when said composition is cooked. In particular, fruit filling compositions having a soluble solids content of from about 47% to about 51% have been found to satisfactorily withstand the rigors of contact with hot frying medium without evolving excessive amounts of steam. The high solids content of the filling is believed to increase the melting point of the composition which prevents boil-out of the composition when exposed to the heat of the frying medium. In addition, the preferred composition, regardless of which fruit flavoring agents it contains, includes evaporated apples for the dual purpose of adding to the solids content as well as stabilization of available water during the cooking process. The binding of available water decreases the possibility of this water being released as steam to a sufficient extent such that the composition may be directly exposed to frying medium at cooking temperatures without disintegrating.

Such fruit filling compositions can contain the following ranges of ingredients by weight: 12.2 to 15.0% dehydrated fruit present as 4.9 to 15.0% evaporated apple and 0.0 to 7.3% other dehydrated fruit, such as dehydrated cherries, blueberries, apricots and raspberries, 4.0 to 5.5% modified food starch, 36.0 to 45.4% water, 7.1 to 22.2% of a high fructose corn syrup having a dextrose equivalent (DE) of 42, such as Staley Isosweet 5500, manufactured by Arthur E. Staley, Inc., 15.0 to 21.6% of a corn syrup characterized by a dextrose equivalent (DE) of 62, such as Amaizo 44, manufactured by American Maize products, Inc. In addition, such compositions may contain 2.0 to 3.0% other fresh or processed hydrated fruit and minor amounts of natural or artificial flavoring agents, as well as citric acid, sodium citrate, potassium sorbate, sodium benzoate, preferably in amounts of less than 2% by weight.

A preferred method of preparing the fruit filling compositions involves forming a mixture of the ingredients which is less than or equal to about 35% solids content and heating that mixture to a temperature of about 180° F. to about 200° F. until the starch thickens. The remaining corn syrup is added to form a mixture containing up to about 45 to about 50% solids, preferably about 48% solids. The resulting composition has an overall moisture content of about 50 to about 55%, preferably about 52%. Examples of fruit filling composition formulations are given in Table II.

TABLE II

| | FRUIT FILLING COMPOSITIONS | | | | |
| --- | --- | --- | --- | --- | --- |
| Ingredients | Cherry | Raspberry | Blueberry | Apricot | Apple |
| Evaporated Apples | 12.5% | 15.0% | 12.5% | 4.9% | 13.7% |
| Evaporated Apricot | 0 | 0 | 0 | 7.3% | 0 |
| Other Fruit | 3.0% | 2.0% | 2.0% | 0 | 0 |
| Modified Food Starch | 5.0% | 4.0% | 5.5% | 5.4% | 5.0% |
| Water | 37.5% | 38.0% | 36.0% | 42.8% | 41.9% |
| High Fructose Corn Syrup (DE) = 42 | 20.0% | 20.0% | 21.7% | 19.5% | 22.2% |
| Corn Syrup-44 (Amaizo) (DE) = 62 | 19.0% | 20.2% | 21.6% | 19.5% | 15.0% |

The mixed dough composition can be formed into a continuous elongated sheet, of dimensions such as, for example, about eight inches wide and 8/16 inches thick. A layer of shortening which is solid at room temperature, can then be applied. The dough subsequently may be layered by coiling in order to produce a dough-shortening laminate containing as many as 243 layers. A preferred number of layers for the purposes of the present invention is about 108. Care should be taken to assure that the product is maintained at temperatures below the melting point of the shortening laminate until it is cooked.

The resulting dough-shortening laminate is similar to that used in baked Danish pastry-type products except that the layers of shortening applied to the dough are thinner in the process of the present invention. This results in a dough-shortening laminate of reduced shortening content. Such reduction in shortening content is desirable since it results in a fried product which is flakey, but not greasy. Dough-shortening laminates of conventional shortening content have been found to be excessively greasy when fried. Conventional Danish pastry dough laminates generally contain about 3½ to about 4 ounces of shortening per pound of dough, while dough laminates of the present invention which are cooked by frying generally contain only about one to about two ounces, preferably about 1½ ounces of shortening per pound of dough.

The resulting coiled dough-shortening laminate produced by the process of the invention is retarded by exposure to a reduced temperature of about 36° F. to about 38° F. for a period of about 60 to about 120 minutes, preferably 75 to about 90 minutes. The dough is then folded, retarded under similar conditions for another hour, folded again and subsequently retarded from about 12 to about 24 hours, preferably about 16 to about 18 hours. The retarding process serves to allow slow uniform development of the glutten present in the dough.

The retarded dough-shortening laminate is then rolled to a uniform thickness, for example by being passed along a conveyor through sheeting rollers where it is formed into long continuous sheets. Preferred dimensions for the laminate at this stage are about 4 inches in width and about 3/32 inches in thickness. As shown in FIG. 1, the sheeted dough laminate ACFH is perforated on one side ABGH of the laminate length, preferably by being transversely slotted. Said perforations (a), (b), (c), (d) are preferably made in a series of four, which are about 1¼ inches in length and ¾ inches apart. Every fourth perforation (d) is preferably separated from its following perforation by a distance of about 1½ inches. Such slots may be made by positioning over the laminate sheet a revolving disc-shaped slotting device which contains perforating blades arranged along its perimeter in a series complementary to the slotting pattern desired in such a way that the perforating blades contact and perforate the dough sheet.

Referring again to FIG. 1, after the perforating step is completed, a portion of fruit filling composition (e) is deposited on the unperforated side of the dough/shortening laminate, BCFG. Preferably, the filling composition can be placed in the center of the unperforated side to avoid interference with subsequent cutting and sealing operations. The amount of filling composition deposited on the dough/shortening laminate can range from about 80% to about 120% by weight of the dough/shortening laminate section on which the filling composition is placed. It is preferred that the weight of the filling composition deposited be approximately equal to that of the laminate section receiving the filling composition.

Referring once more to FIG. 1, following the placing of the fruit filling composition onto the dough-shortening laminate, the perforated side (ABGH) of the laminate is folded over the unperforated side (BCFG) along the longitudinal fold (BG) so that the perforated side of the laminate covers the deposited filling composition and the unperforated side of the dough-shortening laminate. A preferred means for accomplishing this folding over step utilizes an inverted funnel-shaped apparatus called a plow which folds over the slotted side of the laminate by positioning the perforated dough portion in matching alignment edge-to-edge with the unperforated dough portion. The longitudinal edges (AH) and (CF) of the resulting product are sealed by moisture which is applied along the longitudinal edge of the dough surface in the form of a finely atomized mist or spray made by forcing water through an atomizing spray nozzle with compressed air.

Following the process of folding-over, the resulting product is transversely cut and simultaneously sealed by a cutter at regular intervals (AC), (JD), (IE), et cetera. In the preferred embodiment the transverse cut is made after every fourth perforation (d) before the first member of the next series of perforations (a). It is also preferred that the transverse cuts and seals be centered between the last perforation of the individual snack product (d) and the first perforation of the succeeding individual product (a). Thus, the breaks in the series of slots serve as locations for the transverse cuts which set off the dough products from one another. A preferred way of performing the cutting and sealing operation utilizes an apparatus which contains transversely-placed blades which extend across the entire width of the folded-over dough product. The blades of the apparatus are preferably dull so that they not only cut the dough product but crimp the transverse edges of the resulting cut as well.

The resulting cut and sealed fruit filling composition-containing dough products can be rectangular-shaped with an unperforated bottom layer of dough, a fruit filling composition in the center and a perforated layer of dough laid over the fruit filling composition. The perimeters of the bottom layer and the top layer may be sealed together so as to form an envelope which surrounds the fruit filling composition. The product may be quick-frozen for storage at this point.

The next step in the process of the invention is to proof the resulting cut and sealed products. Proofing involves subjecting such products prior to cooking to temperature and humidity conditions which activate the yeast present in the dough. It is desirable to proof at temperatures which are about 2° to about 5° F. lower than the temperature at which the solid shortening lamina present in the dough will melt. Advantageous temperatures for proofing range from about 90° F. to about 110° F. Advantageous humidity for such processes range from about 60% to about 80% humidity. The duration of proofing is generally about 20 to 30 minutes. Preferred conditions for the process of the present invention are found to be about 100° to about 110° F. at about 70% humidity for a period of about 25 to about 30 minutes.

After proofing, the resulting precursor product may be conducted directly to a frying medium which is heated to a cooking temperature suitable for frying dough. The proofed product is fried in the frying medium, which can be a vegetable oil, preferably soybean oil, for a period of from about 90 seconds to about 150 seconds with the preferred frying time being about 90 seconds. Suitable frying temperatures have been found to range from 360° F. to 390° F., preferably 375° F. to 380° F. The use of an automatic fryer large enough to process 160 pieces per minute has been found to be advantageous. The precursor product may be completely submerged in frying medium during cooking. Another embodiment of the process exists wherein the precursor product is partially immersed in frying medium, one side at a time, the frying time for each side being one-half the entire frying time for the completely submerged products.

During the frying of the food product, the following is believed to occur. The solid shortening layers within the dough-shortening laminate melt into the dough while the exterior surfaces of the laminate are cooked to a golden brown. The frying medium furthermore passes through the perforations on the upper layer of the product where it contacts the interior surfaces of the dough-shortening laminate. The perforations function during frying by providing an outlet for expanding air or steam evolved within the interior of the product during frying. In addition, the perforations permit the hot frying medium to contact portions of the interior sides of the dough-shortening laminate which results in the cooking of the laminate from the inside as well as from the outside. While the frying medium is present within the product interior, the fruit filling composition is contacted by the frying medium. It is a unique aspect of this invention that the filling composition can withstand the rigors of such contact with the frying medium without degrading. The filling composition remains congealed throughout the cooking process and remains within the interior of the product.

After frying, the cooked product may be cooled to a temperature suitable for packaging and subsequently packaged for distribution. Product temperatures which are amenable to the packaging of the product range from 80° F. to 100° F., preferably about 90° F. to 95° F.

Another embodiment of the process of the invention includes the application of an icing composition to the fried product. Upon removal from the fryer, the surface temperature of the product is about 170° F. to 190° F. The product is allowed to cool to a temperature at which an icing composition may be advantageously applied. It has been found that the surface temperature of the product of the invention to which icing may be advantageously applied ranges from 90° F. to 130° F., preferably about 110° F. to 115° F. During the time required to sufficiently cool the product, frying medium still on the surface of the product is allowed to drain or be absorbed into the product surface. When the excess frying medium has been sufficiently drained and absorbed, and the product sufficiently conditioned, icing composition may be applied to all or part of the partially-tempered product surface. By selecting an icing composition which may be applied prior to the product reaching ambient temperature, it has been found that substantial reductions in cooling time and conveyor length can be made.

The icing composition used in the processes of the invention may be any conventional high-solids icing. Conventional high-solids icing ingredients include granulated sucrose, powdered sucrose, dextrose, shortening, whey, agar, vegetable gums, corn syrup solids, water and fat flakes. Such icing compositions can be applied to the partially-cooled product by conventional apparatus such as an icing-containing tank dolly with an oscillating unit, such as an Universal Tee-Head. Such an apparatus is comprised of a holding tank which is water-jacketed to thermostatically control temperatures, a pumping device to force the icing through the Tee-Head unit, along with an eccentric motorized cam device to achieve various icing patterns over the surface of the fried food product.

After the icing is applied the product can then be further cooled to a temperature suitable for packaging, that is, a temperature ranging from about 80° F. to about 100° F., preferably about 90° F. to 95° F. The resulting cooled product may then be packaged according to conventional methods for distribution.

It is also possible to use the aforementioned process of the invention to make a product from an unlaminated dough composition. One such embodiment would involve a dough composition such as that described above to which about 1 to about 2 ounces of shortening per pound of dough composition, preferably about 1½ ounces of shortening per pound of dough composition, is added. Such a dough composition can be formed into unlaminated longitudinal sheets of dough which can be perforated, folded, and otherwise processed in the same way as the laminated dough-shortening composition to produce a food product.

Although illustrative embodiments of the invention have been described in detail herein with reference to the accompanying drawing, it is to be understood that the invention is not limited to the precise embodiments and that various changes and modifications may be effected therein without departing from the scope or spirit of the invention.

It is claimed:

1. A process for making a fried fruit filled, yeast dough product which comprises: forming a fruit filled, yeast dough product by enveloping a fruit filling in an envelope of a yeast dough which is capable of being cooked by frying, said fruit filling being impervious to contact with a frying medium under cooking conditions and having a soluble solids content of about 47% to about 51% by weight and about 12.2 to about 15.0% dehydrated fruit, at least a portion of which is evaporated apple, said yeast dough envelope having one or more perforations exposing said fruit filling, and immersing at least a portion of the fruit filled, yeast dough product in a frying medium under frying conditions for a time sufficient to allow the frying medium to fry said yeast dough envelope.

2. The process of claim 1 wherein the fruit filling includes from about 4.9 to 15.0% evaporated apple and 0.0 to 7.3% other dehydrated fruit selected from the group consisting of dehydrated cherries, blueberries, apricots and raspberries.

3. The process of claim 2 wherein the fruit filling includes from about 2.0 to 3.0% fresh or processed fully hydrated fruit.

4. The process of claims 1, 2 or 3 wherein the yeast dough is a Danish pastry dough-shortening laminate containing about 1 to 2 ounces of shortening per pound of yeast dough.

5. A process for making a fried fruit filled, yeast dough product comprising: interleaving lengths of yeast dough sheets with layers of shortening composition to form a dough-shortening laminate containing about 1 to 2 ounces of shortening per pound of dough; forming perforations along one side of the dough-shortening laminate length; depositing a portion of fruit filling at predetermined intervals along the unperforated side of the dough-shortening laminate length; said fruit filling being impervious to contact with a frying medium under frying conditions and having a soluble solids content of about 47% to about 51% by weight and about 12.2 to about 15.0% dehydrated fruit, at least a portion of which is evaporated apple; folding the perforated side of the dough-shortening laminate over the filling and the unperforated side of the dough-shortening laminate; cutting and sealing across the length of the filled dough-shortening laminate to form an individual fruit filled, yeast dough product; proofing the individual fruit filled, yeast dough product under yeast-activating conditions, thereby forming a proofed individual fruit filled, yeast dough product, and finally frying said proofed individual fruit filled, yeast dough product.

6. A process for making a fried fruit filled, yeast dough product with icing comprising: interleaving lengths of yeast dough sheets with layers of shortening composition to form a dough-shortening laminate containing about 1 to 2 ounces of shortening per pound of dough; forming perforations along one side of the dough-shortening laminate length; depositing a portion of fruit filling at predetermined intervals along the unperforated side of the dough-shortening laminate length; folding the perforated side of the dough-shortening laminate over the fruit filling and the unperforated side of the dough-shortening laminate; said fruit filling being impervious to contact with a frying medium under frying conditions and having a soluble solids content of about 47 to about 51% by weight and about 12.2 to about 15.0% dehydrated fruit, at least portion of which is evaporated apple; cutting and sealing across the length of the filled dough-shortening laminate to form an individual fruit filled, yeast dough product, proofing the resulting individual fruit filled, yeast dough product under yeast-activating conditions; frying the proofed individual fruit filled, yeast dough product and applying icing to the external surface of the fried product.

7. The process of claims 1, 5 or 6 wherein frying is conducted at temperatures of about 375 degrees F to about 380 degrees F.

8. The process of claims 5 or 6 wherein said yeast-activating conditions comprise exposure of the individual fruit filled, yeast dough product to temperatures of 90 degrees F to 110 F degrees at 60% to 80% humidity for a period of about 20 to about 30 minutes.

9. The process of claim 8 wherein said yeast-activating conditions comprise exposure of the individual fruit filled, yeast dough product to temperatures of 100 degrees F to 110 degrees F at 70% humidity for a period of about 25 to about 30 minutes.

10. The process of claims 1, 5 or 6 wherein the fruit filling comprises the following ingredients: evaporated apple, about 4.9 to about 15.0% by weight; dehydrated cherries, blueberries, apricots, or raspberries, about 0.0 to about 7.3% by weight; modified food starch, about 4.0 to about 5.5% by weight; high fructose corn syrup having a dextrose equivalent (DE) of 42, about 7.1 to about 22.2% by weight; corn syrup having a dextrose equivalent (DE) of 62, about 15.0 to about 21.6%; and water exclusive of that contained in the other ingredients, about 36.0 to about 45.4%.

11. The process wherein the fruit filled, yeast dough product of claim 1 or wherein the proofed individual fruit filled, yeast dough product of claims 5 or 6 is fried for about 90 to about 150 seconds.

12. The process wherein the fruit filled, yeast dough product of claim 1 or wherein the proofed individual fruit filled, yeast dough product of claims 5 or 6 is completely immersed in frying medium during frying.

13. The process wherein the fruit filled, yeast dough product of claim 1 or wherein the proofed individual fruit filled, yeast dough product of claims 5 or 6 is partially immersed in frying medium, one side at a time.

* * * * *